United States Patent [19]

Matsunaga et al.

[11] Patent Number: 4,632,984

[45] Date of Patent: Dec. 30, 1986

[54] PROCESS FOR THE PRODUCTION OF CATIONIC STARCH

[75] Inventors: Yoshiki Matsunaga, Sagamihara; Toshiaki Sugiyama, Hatano; Eikichi Maekawa, Samukawamachi, all of Japan

[73] Assignee: Kyoritsu Yuki Co., Ltd., Japan

[21] Appl. No.: 758,268

[22] Filed: Jul. 24, 1985

[30] Foreign Application Priority Data

May 2, 1985 [JP] Japan ................................ 60-94937

[51] Int. Cl.$^4$ ............................................. C08B 31/08
[52] U.S. Cl. ...................................... 536/50; 536/45; 162/175
[58] Field of Search ........................... 536/50, 45, 48; 162/175

[56] References Cited

U.S. PATENT DOCUMENTS

| | | | |
|---|---|---|---|
| 2,316,129 | 4/1943 | Bock et al. ........................... | 536/50 |
| 2,959,514 | 11/1960 | Woodberry ...................... | 162/168.4 |
| 2,959,574 | 11/1960 | Woodberry ........................ | 525/377 |
| 3,264,283 | 8/1966 | Jarowenko ............................ | 536/50 |

FOREIGN PATENT DOCUMENTS 214534  8/1956  Australia ............................... 536/50

*Primary Examiner*—Ronald W. Griffin
*Attorney, Agent, or Firm*—Ostrolenk, Faber, Gerb & Soffen

[57] ABSTRACT

The present invention relates to a process for producing novel cationic starch comprising the step of reacting starch having cyanoethyl groups or starch having cyanoethyl groups and quaternary aminoalkyl groups with hydroxylamine or the salts thereof to amidoximate the reaction product.

The resulting cationic starch of the invention exhibits significant advantages as compared with those of conventional cationic starch as a dry strengthening agent.

6 Claims, No Drawings

PROCESS FOR THE PRODUCTION OF CATIONIC STARCH

BACKGROUND OF THE INVENTION

In paper making industry, cationic starch has widely been used by including the same in pulp at the time of paper making thereof as dry strength agent, retention aid, drainage aid, printability improver and the like. Furthermore such cationic starch has variously been utilized as warp sizing agent and finish in textile industry, besides as flocculant, emulsifier and the like in other industries.

As the process for producing cationic starch as described above, generally practiced is such a process which comprises either reacting pasty or slurry starch with an alkylamine halide such as diethylaminoethyl chloride or an aminochlorohydrin compound such as 3-chloro-2-hydroxypropyltrimethylammonium chloride, or with a glycidylamine such as 2, 3-epoxypropyltrimethylammonium chloride in the presence of strong alkali as described in Starch: Chemistry and Technology, vol II, 1967, pp. 403–420, Academic Press Co.

SUMMARY OF THE INVENTION

The present invention contemplates to provide a process for the production of cationic starch having remarkable advantages as a dry strengthening agent which comprises the steps of reacting starch or quaternary aminoalkylated starch with acrylonitrile in the presence of alkali to cyanoethylate hydroxyl groups of the starch, and further reacting the thus cyanoethylated starch with hydroxylamine or the salts thereof to amidoximate the cyanoethyl groups.

Such cyanoethylated starch has been publicly known (U.S. Pat. No. 2,316,129), and furthermore the amidoximating reaction has been publicly known as a method for modifying acrylonitrile polymer (U.S. Pat. Nos. 2,959,574 and 2,959,514 as well as British Pat. No. 786,960 etc.), such reaction being expressed by the following equation:

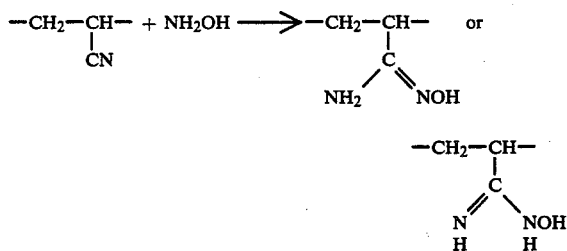

Such amidoximated starch obtained by reacting cyanoethylated starch with hydroxylamine is cationic starch in which amidoxime groups dissociate in acid conditions to exhibit cationic activity. When such cationic starch is included in pulp as a dry strengthening agent and examined, absorption to the pulp is favorable in acidic paper making so that the cationic starch exhibits remarkable dry strengthening effect. In this respect, the present inventors continued their study and as a result, they have found not only such fact that the amidoxime groups in said amidoximated starch dissociate in acidic condition to afford cationic acitivity to the starch, thereby permitting the starch to be adsorbable to pulp so that improvement for dry strength due to the starch appears, but also that the amidoxime groups themselves contribute for the dry strength. Namely, dry strengthening effect of conventional cationic starch exhibits some improvement with a rise in degree of cationic activity, but there is, in general, no increase further in such effect, whilst it has been observed in the amidoximated starch according to the present invention that the dry strengthening effect is also substantially continuously elevated. However, since the amidoxim group is a primary or secondary amine, it does not dissociate in neutral or alkaline conditions so that there is no adsorption of amidoximated starch to pulp in case of neutral or alkaline paper making. As a result, no dry strengthening effect was observed in such case as mentioned above. For solving this problem, quaternary aminoalkyl groups are further introduced into said admidoximated starch. Thus it was observed that remarkable improvement in dry strength with an increase in degree of amidoximation in also achieved in neutral or alkaline paper making wherein amidoxime groups do not dissociate as in the case of acidic paper making of amidoximated starch without any modification. In this case, since amidoxime groups are not dissociated, it has been found that dry strengthening effect of the amidoxime groups is irrespective of dissociation.

Furthermore, quaternary aminoalkylated starch being a starting material of the present invention has been used as a dry strengthening agent in the paper making industry. However, when the present inventors studied effect of quaternary aminoalkylated starch as dry strengthening agent for including the same in pulp in case of neutral or alkaline paper making, it became apparent that quaternary aminoalkyl groups are indispensable for adsorption of starch with respect to pulp, but it was difficult to observe such effect of a dry strengthening agent in the quaternary aminoalkyl groups themselves, and improvement in dry strength was derived from the adsorbed starch. As a matter of course, if quaternary aminoalkyl groups are increased with respect to starch, a degree of cationic activity of such starch rises and adsorption of the starch for pulp increases also, so that some improvement in paper strength may be observed. However, significant elevation of dry strength cannot be expected from that attained by increasing amount of starch.

From the above results, we have found that both of amidoximated starch and quaternary aminoalkylated starch exhibit excellent dry strengthening effects in acidic and neutral or alkaline paper making, respectively. It is needless to say that amidoximated aminoalkylated starch is also effective for case of acidic paper making.

DESCRIPTION OF THE PREFERRED EMBODIMENT

The process for the production of cationic starch having remarkable advantages as a dry strength agent according to the present invention and the application thereof as a dry strengthening agent will be described hereinbelow.

Gelatinization is effected in accordance with conventional procedure by adding water to starch to prepare a slurry mixture, and further adding alkali to the slurry mixture. Powdery or liquid quaternary aminoalkylated starch is commercially available.

Such quaternary aminoalkylated starch has the following general formula:

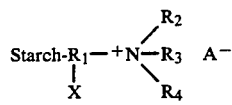

wherein $R_1$ is $C_1$-$C_4$ alkylene group, $R_2$, $R_3$ or $R_4$ is $C_1$-$C_4$ alkyl group, X is hydrogen atom or hydroxyl group, and A is acid residue.

In the present invention, either such commercially available quaternary aminoalkylated starch may be used as the starting material, or such starch may originally be prepared in accordance with such a manner that starch is gelatinized in alkaline condition, then 2, 3-epoxypropyltrimethylammonium chloride or 3-chloro-2-hydroxypropyltrimethylammonium chloride is added thereto, and the resulting mixture is warmed at a temperature of around 60° C. to react the same. This reaction may also be carried out at the same time or after the undermentioned cyanoethylation.

When the aforesaid gelatinized starch liquid or quaternary aminoalkylated gelatinized starch liquid is mixed with a prescribed amount of acrylonitrile in strong alkaline condition and the mixture is reacted with stirring, each of the corresponding cyanoethylates can be obtained. The cyanoethylating reaction is very rapid in strong alkaline conditions i.e., the reaction terminates at room temperature at around 6 hours, and the reactivity thereof reaches 90% or more.

The cyanoethylated starch liquid thus obtained is mixed with equimolar hydroxylamine salt with respect to the acrylonitrile added to be adjusted such that a pH of the solution becomes 7.0 to 9.0. While hydroxylamine is commercially available in the form of hydrochloride or sulfate, it is required in this case to adjust pH such that hydroxylamine is in a free state by adding alkali or acid in case of the reaction in response to an amount of the existing alkali at the time of cyanoalkylation. The amidoximating reaction is carried out at a temperature of 60° C. or more. The reaction time thereof depends on the reaction temperature, i.e., about 60% of cyanoethyl groups are amidoximated at 70° C. for 3 to 4 hours, and 85° C. for around 2 hours, respectively. After the reaction, an acid corresponding to the amidoxime groups is added to the reaction product to neutralize it. Furthermore, when quaternary aminoalkylated starch which has been previously cyanoethylated is subjected to amidoximation, quaternary amidoximated starch may be obtained.

The above reaction may be schematically expressed as follows, when quaternary aminoalkylated starch is used as its starting material:

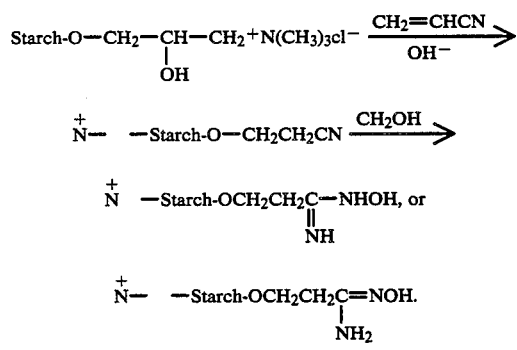

A degree of conversion of the amidoximated starch thus obtained can be estimated with respect to the amidoximation thereof in accordance with conventional colloidal titration method. Such colloidal titration method has been reported in J. Poly. Sci., 8, 243 (1952) where a sample corresponding to 10 mg of starch is weighed, diluted with distilled water, and the titration is effected with N/400 potassium polyvinylsulfonate in acetic acid acidified and ammoniacal conditions by using Toluidine Blue as an indicator. As a result of the titration, the total amine and quaternary amine are determined in acetic acid acidified and ammoniacal conditions, respectively. In this reaction, however, carboxylic acid is produced by partial saponification at the time of cyanoethylating and amidoximating reaction, and such carboxylic acid combines intermolecularly with quaternary amine, so that amount of the quaternary amine measured is less than that existing the actual. Thus, actually amidoximated amount must be somewhat lower than the value obtained by subtracting the ammoniacally measured value (amount of quaternary amine) from acetic acid acidified measured value (total amine content).

In case of starting from starch, it is sufficient that only the acetic acid acidified value (total amine content) is measured.

The aforesaid amidoximated starch is included in pulp slurry at the time of paper making as in the case where a usual dry strengthening agent is used. As a result, it was observed that amidoximated agents derived from starch or quaternary aminoalkylated starch and amidoximated agents of quaternary aminoalkylated starch exhibited remarkable improvement in dry strength in acid and neutral or alkaline paper making, respectively, in response to their degrees of amidoximation. Particularly, significant elevation of dry strength was observed with respect to amidoximated agents of quaternary aminoalkylated starch in case of neutral or alkaline paper making as compared with quaternary aminoalkylated starch being the starting material. On the other hand, a rise in degree of aminoalkylation scarcely exhibited advantage in dry strength.

The effect for dry strength is measured herein in accordance with "Bursting Strength of Paper" TAPPI T 403 OS-76.

Pulps such as LUKP, NUKP, corrugated waste pulp and the like other than ordinary LBKP and NBKP are also effective for those used in the present invention.

By the use of the amidoximated cationic starch according to the present invention, not only dry strength attained by including such cationic starch in pulp slurry, but also drainage retention and the like are improved, and surface strength of papers can be elevated by means of sizing press. It is a matter of course that the cationic starch of the present invention may also be utilized for other general applications of cationic starch.

The present invention will be specifically described hereinbelow in conjunction with the following examples, but it is to be noted that the invention is not limited thereto.

EXAMPLE 1

Preparation of Amidoximated Starch (1) Cyanoethylating reaction 46 g of cornstarch (13% moisture content, 0.247 mol starch) are weighed out and placed into a three-necked flask equipped with a stirrer and a reflux condenser. 300 ml of distilled water are added to the cornstarch, the mixture is sufficiently dispersed, 30 ml of 5N NaOH are added to the dispersion, and it is agitated at 80° C. for 30 minutes to gelatinize the same.

After the gelatinization, the resulting product is cooled to room temperature, 3.3 g of acrylonitrile (0.062 mol with respect to 25 mol % starch) are added thereto, and the resulting mixture is reacted at room temperature for 6 hours.

(2) Amidoximating reaction 5.1 g (0.062 mol) of equimolar hydroxylamine sulfate of said acrylonitrile are dissolved in 20 ml of distilled water, the solution is added to the product of (1), and they are reacted at 70° C. for 3 hours. At the time of starting the reaction, 16 ml of 5N $H_2SO_4$ are added to adjust pH of the reaction solution to 8.0. After completing the reaction, the product is neutralized by the use of sulfuric acid to obtain a pH of 3.0. The resulting final product will be hereinafter referred to as "Sample I".

(3) Measurement for degree of amidoximation

A certain amount of sample corresponding to 10 mg of starch was weighed out from Sample I, diluted with 100 ml of distilled water, and the resulting solution was titrated with N/400 potassium polyvinylsulfonate (hereinafter referred to simply as "PVSK") in acetic acid acidified condition by utilizing Toluidine Blue as the indicator, whereby a measured value of 4.2 ml was obtained. This value corresponds to a rate of addition of amidoxime groups with respect to 17 mol % starch.

EXAMPLE 2

Preparation of Amidoximated Starch

The starch sizing solution obtained in accordance with the same manner as that of Example 1 was mixed with 6.6 g (0.124 mol with respect to 50 mol % starch) of acrylonitrile to effect cyanoethylation. Thereafter 10.2 g (0.124 mol) of hydroxylamine sulfate were added to the resulting product thereby amidoximating the same. At the time of amidoximating reaction, 4 ml of 5N $H_2SO_4$ were added to adjust pH to 8.0. The conditions other than those described above are the same with those of Example 1. A PVSK consumption of the product was 6.9 ml, and a rate of addition for amidoxime groups was 28 mol % to starch. The resulting product will be hereinafter referred to as "Sample II".

EXAMPLE 3

Preparation of Quaternary Amidoximated Starch (1) Quaternary aminoalkylating reaction 46 g of cornstarch (13% moisture content, 0.247 mol starch) are weighed out and placed into a three-necked flask equipped with a stirrer and a reflux condenser. 300 ml of distilled water are added to the cornstarch, the mixture is sufficiently dispersed, 30 ml of 5N NaOH are added to the dispersion, and they are agitated at 80° C. for 30 minutes to gelatinize the same.

After the gelatinization, bulk temperature of the product is lowered to 60° C., 7.5 g (0.025 mol with respect to 10 mol % starch) of 50% aqueous 3-chloro-2-hydroxy-propyl-trimethylammonium chloride are added thereto, and the resulting mixture is reacted for 2 hours. As a result of colloidal titration, quaternary aminoalkylation was 6.0 mol % with respect to starch. The product thus obtained will be hereinafter referred to as "Sample A".

(2) Cyanoethylating reaction and amidoximating reaction

Acrylonitrile and hydroxylamine sulfate were reacted with the quaternary aminoalkylated starch solution of Sample A in accordance with a similar manner to that of Example 1 with each varying amount of both the acrylonitrile and hydroxylamine sulfate shown in the following Table 1, whereby samples 25-A, 50-A, and 70-A (each charging mol% being shown by a figure) of various degrees of amidoximation were obtained.

TABLE 1

| Name of Sample | Raw Material Acrylonitrile To Starch | Amount Added | Hydroxylamine Sulfate | Analytical Value Total Amine | Quaternary Amine | Degree of Amidoximation |
|---|---|---|---|---|---|---|
| 25-A | 25 mol % | 3.3 g | 5.1 g | 23.3 mol % | 6.5 mol % | 15.8 mol % |
| 50-A | 50 mol % | 6.6 g | 10.2 g | 32.8 mol % | 6.0 mol % | 26.8 mol % |
| 70-A | 70 mol % | 9.3 g | 14.4 g | 49.4 mol % | 6.1 mol % | 43.3 mol % |

EXAMPLE 4

Preparation of Quaternary Amidoximated Starch (1) Quaternary aminoalkylating reaction By varying an amount of 3-chloro-2-hydroxypropyl-trimethylammonium chloride (hereinafter referred to simply as "CTA") to be added in Example 3- (1) as shown in the following Table 2, various quaternary aminoalkylated starch of different amounts of addition were experimentally prepared.

TABLE 2

| Name of Sample | 50% CTA To Starch | Amount Added | Amount Added of Quaternary Amine |
|---|---|---|---|
| B | 5 mol % | 3.8 g | 3.2 mol % |
| C | 15 mol % | 11.3 g | 8.5 mol % |

(2) Cyanoethylating reaction and amidoximating reaction

Acrylonitrile and hydroxylamine sulfate were amidoximated with 50 mol % charging with respect to starch in accordance with a similar manner to that of Example 1 by using quaternary aminoalkylated starch solution of said Samples B and C, and the results thereof are shown in Table 3.

TABLE 3

| Name of Sample | Analytical Value Total Amine | Quaternary Amine | Degree of Amidoximation |
|---|---|---|---|
| 50-B | 32.2 mol % | 3.2 mol % | 28.0 mol % |
| 50-C | 34.4 mol % | 8.5 mol % | 25.9 mol % |

(Figure in the Name of Sample indicates charge mol % of acrylonitrile.)

EXAMPLE 5

Dry Strength Test

Dry strength tests were made in acid paper making with respect to amidoximated starch Samples I and II prepared experimentally in Examples 1 and 2, and as a control, quarternary aminoalkylated starch Sample A prepared experimentally in Example 3.

Paper making conditions were as described hereinbelow. An LBKP of 400 ml C.S.F. degree of beating was used, and subjected to paper making under condition of 50 g/m² basis weight in accordance with TAPPI standard. The samples were mixed with respect to pulp with two levels of 0.5% and 1.0%, and 3% alum, respectively, and paper making pH was 5.7. Dry strength is represented by specific burst strength, and the results thereof are shown in the following Table 4.

TABLE 4

| | Specific Burst Strength | | |
|---|---|---|---|
| | Degree of | Acid Paper Making | |
| Name of Sample | Amidoximation | 0.5% | 1.0% |
| I | 17 mol.% | 2.59 | 3.12 |
| II | 28 mol % | 2.79 | 3.38 |
| A | *6.0 mol % | 2.16 | 2.43 |
| blank | — | 1.80 | — |

*A = quaternary aminoalkylated starch, numerical value: amount of quaternary amine.

As is apparent from Table 4, it is observed that there is remarkable improvement in dry strength of the amidoximates starch Samples I and II according to the invention of this application as compared with Sample A corresponding to commercially available cationic starch, and dry strengthening effect is also elevated with the increase of degree of amidoximation.

EXAMPLE 6

Dry Strength Test

Dry strength tests were effected in both acid paper making (addition of 3% alum) and alkaline paper making (pH 8.5) with respect to quaternary amidoximated starch prepared experimentally in Example 3 in accordance with a similar manner to that of Example 5.

TABLE 5

| | Specific Burst Strength | | | | | |
|---|---|---|---|---|---|---|
| | Analytical Value | | | | | |
| | Degree of | Degree of | Acid Sheet Making | | Alkaline Sheet Making | |
| Name of Sample | Quarternary Amination | Amidoximation | 0.5% | 1.0% | 0.5% | 1.0% |
| A | 6.0 mol % | — | 2.09 | 2.37 | 2.10 | 2.43 |
| 25-A | 6.5 mol % | 15.8 mol % | 2.25 | 2.60 | 2.37 | 2.80 |
| 50-A | 6.0 mol % | 26.8 mol % | 2.41 | 2.77 | 2.47 | 2.92 |
| 70-A | 6.1 mol % | 43.3 mol % | 2.48 | 2.89 | 2.52 | 3.08 |
| blank | — | — | 1.71 | — | 1.74 | — |

As is apparent from Table 5, it is observed that the cationic starch samples (25-A-70-A) prepared by amidoximating quaternary aminoalkylated starch (A) according to the present invention exhibit remarkably elevated specific burst strength in both acid and alkaline paper making as compared with the quaternary aminoalkylated starch (A) being the starting material, and advantages of the amidoximated cationic starch of this invention increase with the elevation in degree of amidoximation.

EXAMPLE 7

Dry Strength Test

Samples wherein degree of amidoximation is kept at a substantially constant value are used with respect to quaternary cationic starch of various degrees of quaternary aminoalkylation, and dry strength was tested in respect of quaternary aminoalkyl groups in alkaline paper making in accordance with a similar manner to that of Example 5.

TABLE 6

| | Specific Burst Strength | | | |
|---|---|---|---|---|
| | Analytical Value | | | |
| | Degree of | | Alkaline Sheet Making | |
| Name of Sample | Quarternary Amination | Degree of Amidoximation | 0.5% | 1.0% |
| 50-A | 6.0 mol % | 26.8 mol % | 2.47 | 2.77 |
| 50-B | 3.2 mol % | 28.0 mol % | 2.53 | 2.83 |
| 50-C | 8.5 mol % | 25.9% | 2.47 | 2.80 |
| blank | — | — | 1.77 | — |

As is clear from Table 6, it is observed that dry strength is not influenced by degree of quaternary amination, if the samples have substantially the same degrees of amidoximation with each other.

EXAMPLE 8

Surface Strength Test of Paper

Surface strength of the papers which were subjected to alkaline paper making by employing Samples A and 50-A was tested with the use of an IGT tester in accordance with a similar manner to that specified in TAPPI T499 Su-64.

Printing conditions for the test were spring A, ink tacking 15, and printing pressure 50 kg/cm², and results of the test were judged by printing speed in respect of fluffing.

TABLE 7

| | Printing Speed | | | |
|---|---|---|---|---|
| | Analytical Value | | | |
| | Degree of | | Printing Speed Cm/Sec | |
| Name of Sample | Quarternary Amination | Degree of Amidoximation | 0.5% | 1.0% |
| 50-A | 6.0 mol % | 26.8 mol % | 115 | 178 |
| A | 6.0 mol % | — | 102 | 128 |
| blank | — | — | 88 | — |

As is apparent from Table 7, it is observed that the cationic starch (50-A) prepared by amidoximating quaternary aminoalkylated starch (A) exhibits remarkably elevated surface strength of paper in comparison with the quaternary aminoalkylated starch (A) being the starting material.

What is claimed is:

1. A process for the production of cationic starch comprising the step of reacting starch having cyanoethyl groups with hydroxylamine or the salts thereof to amidoximate the reaction product.

2. A process for the production of cationic starch as claimed in claim 1 wherein said starch has quaternary aminoalkyl groups other than said cyanoethyl groups.

3. A process for the production of cationic starch as claimed in claim 2 wherein said quaternary aminoalkyl groups have the following general formula:

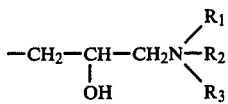

wherein $R_1$, $R_2$, and $R_3$ are $C_1$–$C_3$ alkyl groups, respectively.

4. A process for the production of cationic starch as claimed in claim 2 wherein said quaternary aminoalkyl groups have the following general formula:

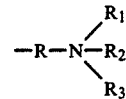

wherein R is a $C_1$–$C_4$ alkylene group, $R_1$, $R_2$, and $R_3$ are $C_1$–$C_3$ alkyl groups, respectively.

5. A method for enhancing dry strength comprising the steps of including the cationic starch having amidoxime groups prepared in accordance with the process as claimed in claim 1 in acid pulp slurry, and effecting the paper making therefor.

6. A method for enhancing dry strength comprising the steps of including the starch having amidoxime groups and quaternary aminoalkyl groups prepared in accordance with the process as claimed in claim 2 in neutral or alkaline pulp slurry, and effecting the paper making therefor.

* * * * *